3,404,906
EXPANSION JOINT
Walter C. Hutton, 1567 Waldren Ave.,
Los Angeles, Calif. 90041
Filed Apr. 1, 1966, Ser. No. 539,370
3 Claims. (Cl. 285—286)

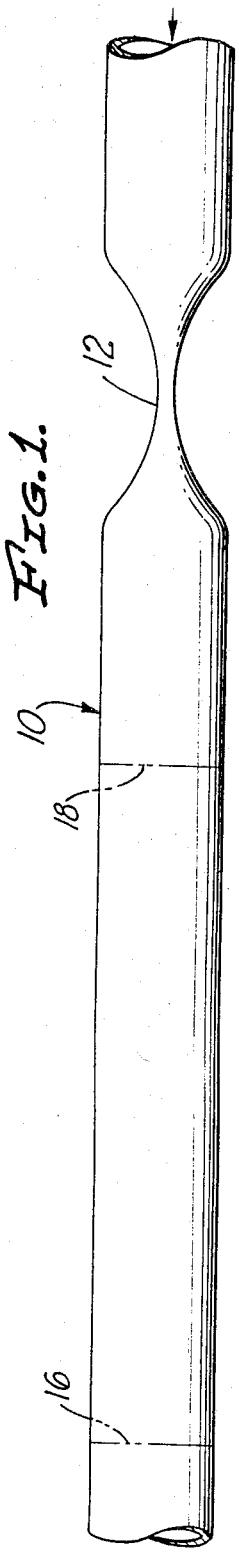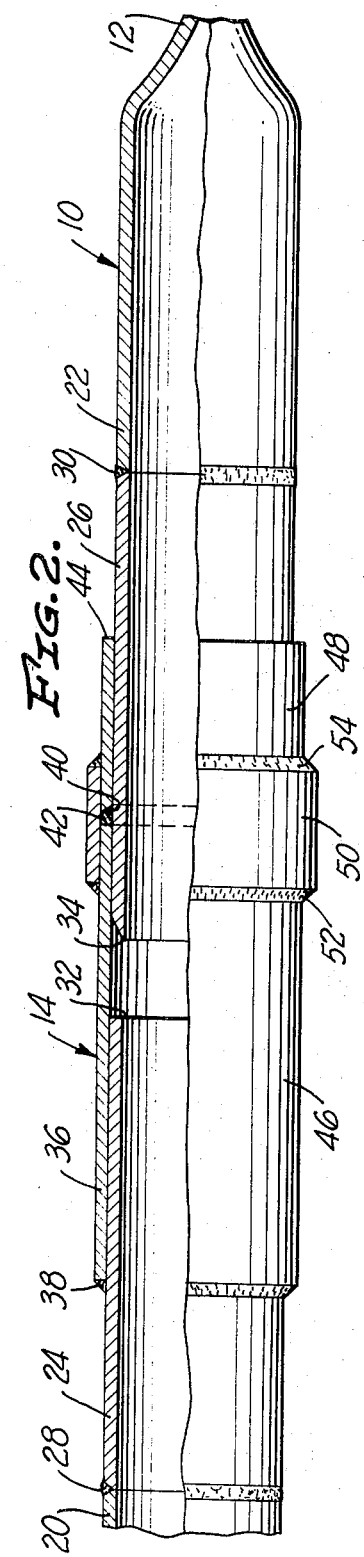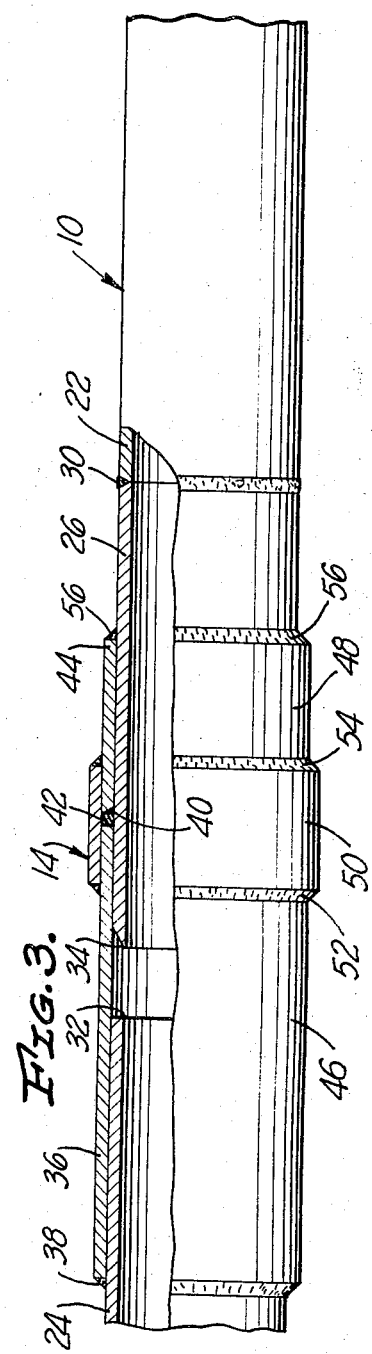
INVENTOR
WALTER C. HUTTON
BY
EDWARD D. O'BRIAN
ATTORNEY

United States Patent Office 3,404,906
Patented Oct. 8, 1968

ABSTRACT OF THE DISCLOSURE

An expansion joint is disclosed which includes first and second tubes having spaced ends. A sleeve is secured to the first tube so as to extend therefrom around the second tube. A sealing ring in the sleeve engages the second tube.

---

This invention is directed to an expansion joint, and particularly to an expansion joint which wholly pressure seals a fluid pipe line during relative rotation and/or expansion of different portions of pipe line, and which expansion joint can be welded closed without damage to the pressure seal, so that a long life, fully sealed joint is obtained.

Certain operations on fluid pressure pipe lines cause expansion and/or rotation of the pipe line while pressure fluid is flowing therethrough. Therefore, it is necessary to provide an expansion joint adjacent such places where expansion or rotation occurs. The expansion joint must provide a fluid pressure type seal during the period of rotation or expansion. Furthermore, the expansion joint should be further sealable by welding, or other metallic joining techniques, after the requirement for accommodation of rotation and/or expansion has been completed. The expansion joint should be of such nature that during the welding operation the pressure seal is not destroyed, so that welding can be completed without fluid pressure leakage. There are no such joints presently known, and known expansion joints are not capable of employment in the manner indicated above.

Accordingly, it is an object of this invention to provide an expansion joint for fluid pressure pipe lines which is capable of accommodating pipe line relative rotation and/or expansion while pressure fluid is flowing through the expansion joint, the expansion joint preventing leakage of the pressure fluid to the outside, the expansion joint being of such character that after the expansion requirement has been accommodated, the joint can be welded, or otherwise metallically sealed, so as to provide a metal to metal full life seal.

It is a further object of this invention to provide such an expansion joint which is economic, trouble free and easy to use so that manpower is conserved and proper seals are obtained in fluid pressure pipe lines.

Other objects and advantages of this invention will become apparent from a study of the following portion of this specification, the claims and the attached drawings in which:

FIG. 1 is a side elevational view of a fluid pressure pipe line in which the expansion joint of this invention is to be inserted;

FIG. 2 is a side elevational view, with parts broken away, showing the expansion joint of this invention inserted in the pipe line; and FIG. 3 is a similar side elevational view, with parts broken away, showing the expansion joint of this invention after relative pipe line expansion and/or rotation has been accommodated and after the expansion joint has been welded into rigid structure.

As an aid to understanding this invention it can be stated in essentially summary form that it is directed to an expansion joint. The expansion joint comprises first and second tubes of size and material the same as the pipe line in which the expansion joint is to be installed. These tubes are spaced from one another in the end-wise direction. A sleeve is welded on the first tube and extends over the second tube so that the second tube is slidably engaged in the sleeve. Furthermore, the sleeve has an outwardly extending annular groove therein and a seal ring is positioned within the groove. The seal ring resiliently engages both on the outside of the second tube and in the sleeve. Furthermore, the seal ring and seal ring groove are spaced from the end of the sleeve on the second tube so that welding of the end of the sleeve to the second tube will not cause sufficient heat at the seal ring to cause seal ring deterioration.

This invention will be understood in greater detail by reference to the following portion of this specification wherein the drawings are described. FIG. 1 illustrates a pipe line adapted to transmit fluid under pressure. The pipe line is generally indicated at 10 and fluid is arranged to move though the pipe line 10 in the right to left direction as shown in the figure. Pressure pipe line 10 occasionally needs be closed to flow. Such closure may be required for routine operations such as connecting a T, or valve maintenance. Often such closure is required for emergency reasons. Particularly in the case of high pressure flammable gas pipe lines, closure to flow must be accomplished. Separately from the invention described in this application, a method has been devised whereby a short longitudinal section of the pipe line can be heated to a relatively high temperature and the pipe line squeeze closed to stop flow. Such a distorted location is illustrated at 12. After the pipe line downstream of the closure 12 has been appropriately acted upon, by repair of the leak, replacement or repair of a valve or addition of a T, the closure 12 is opened by heating and reforming the pipe in the area of closure 12. Such pipe reforming causes longitudinal expansion and/or rotation of the pipe, and it is to accommodate such that the expansion joint 14 is provided.

After the closure 12 is made, a section of the pipe line 10 indicated by dot-dash lines 16 and 18 is cut out so that the expansion joint 14 can be placed therein. This removal results in pipe line ends 20 and 22.

Expansion joint 14 is placed in line with the pipe line 10 between the ends 20 and 22. As it is seen in FIG. 2, first and second tubes 24 and 26 are respectively welded at 28 and 30 into the pipe line 10. Tubes 24 and 26 are preferably of the same interior and exterior diameter and the same material as the pipe line 10. Tubes 24 and 26 terminate in spaced ends 32 and 34. End 34 is chamfered for a purpose hereinafter described.

Sleeve 36 is tubular and has an inner diameter equal to or slightly larger than the outer diameter of tubes 24 and 26. Sleeve 36 is welded to tube 24 at 38 to produce a permanent seal joint.

Sleeve 36 has a seal ring groove 40 therein which contains ring seal 42. Ring seal 42 is preferably of elastomeric material which is unaffected by the fluid in pipe line 10. Ring seal 42 resiliently engages the exterior of tube 26 and resiliently engages seal ring groove 40 so as to produce a tight seal between sleeve 36 and tube 26. If desired, the side of groove 40 toward the end 44 of sleeve 36 can be in conical form so that pressure fluid entering inside the sleeve 36 between ends 32 and 34 forces ring seal 42 more firmly into sealing engagement with the exterior of tube 26 and groove 40. It is seen that the chamfer on end 34 aids in the insertion of tube 26 into ring seal 42 during assembly of the expansion joint 14.

In the embodiment illustrated, the wall thickness of sleeve 36 and the size of ring seal groove 40 are such that the structure can be conveniently manufactured by making sleeve 36 out of two parts 46 and 48 with a collar 50 thereover. The adjacent ends of parts 46 and 48, and the interior surface of collar 50 thus form ring seal groove 40. Collar 50 is apropriately welded at 52 and 54 so as to make the sleeve 36 a unitary sealed structure. This construction eliminates the need for internal machining of the groove 40 within sleeve 36 and it eliminates the need for an unnecessary heavy wall over the entire length of sleeve 36. By means of this construction, all parts can be made from ordinary pipe line materials.

After the expansion joint is inserted into and welded into the pipe line 10, as illustrated in FIG. 2, the closure 12 is opened by heating and working of the pipe line 10 in the area of the closure. This causes expansion and/or rotation of that portion of the pipe line which causes motion of the second tube 26 with respect to th remainder of the expansion joint 14, as is illustrated in FIG. 3. After the opening of closure 12 is completed and that portion of the pipe 10 is permitted to reach ambient temperature, the joint including expansion joint 14 is finally sealed by welding end 44 to tube 26 by means of weld 56 illustrated in FIG. 3. The sleeve part 48 is sufficiently long so that the weld 56 does not create sufficient heat at seal ring 42 to cause its deterioration. Thus, the weld 56 can be completed while the ring seal 42 properly seals the joint. After weld 56 is completed, the entire structure becomes a metal to metal sealed portion of the pipe line 10.

This invention having been described as preferred embodiment, it is clear that it is susceptible to numerous modifications and embodiments within the skill of the routine artisan and without the exercise of the inventive faculty. Accordingly, the scope of this invention is defined by the scope of the following claims.

I claim:
1. An expansion joint adapted to be placed in a pipe line, said expansion joint comprising first and second tubes, said tubes being adapted to be secured to an existing pipe line, said tubes having ends, said ends of said first and second tubes being spaced from each other so as to be relatively movable so as to take up pipe line expansion and relative rotation prior to welding a sleeve to said second tube, a sleeve sealingly secured to the exterior of said first tube, said sleeve extending over the exterior of and over a portion of the length of said second tube, said sleeve terminating in an end, said sleeve end being welded to the exterior of said second tube, an annular ring seal groove in the interior of said sleeve directed toward said second tube, a ring seal in said ring seal groove, said ring seal being in sealing engagement with said groove and with the exterior of said second tube, said end of said sleeve being sufficiently spaced from said ring seal groove so that said weldment of said end of said sleeve to said second tube does not cause sufficient heat on said ring seal to cause sufficient deterioration thereof to permit leakage to pass said ring seal, said sleeve comprising first and second parts, said first and second parts having spaced ends, said spaced ends comprising the sides of said ring seal groove an a collar engaged over a portion of said first and second parts and respectively secured thereto, said collar defining the bottom of said ring seal groove so that the depth of said ring seal groove is equal to the wall thickness of said first and second parts.

2. The expansion joint of claim 1 wherein said end of said second tube spaced from said end of said first tube is externally chamfered at an acute angle relative to the interior of said second tube.

3. The expansion joint of claim 2 wherein said end of said second part away from said end of said sleeve is internally chamfered to aid in sealing of said ring seal against said second tube, said chamfer on said end of said second part being directed away from said end of said ring part so that the bottom of said ring seal groove is smaller than the entrance to said ring seal groove.

References Cited
UNITED STATES PATENTS

| | | | |
|---|---|---|---|
| 1,613,887 | 1/1927 | Gunn | 285—31 |
| 1,690,562 | 11/1928 | Trout | 285—369 X |
| 1,731,761 | 10/1929 | Bulmahn | 285—302 |
| 2,420,139 | 5/1947 | Kelly | 285—286 X |
| 2,747,900 | 5/1956 | Smith | 285—286 X |
| 2,979,050 | 4/1961 | Costello | 285—302 X |
| 3,117,904 | 1/1964 | Black | 251—7 X |
| 3,188,120 | 6/1965 | Peterson | 285—287 X |

FOREIGN PATENTS

| | | |
|---|---|---|
| 758,418 | 11/1933 | France. |
| 1,276,514 | 10/1961 | France. |

CARL W. TOMLIN, *Primary Examiner.*

D. W. AROLA, *Assistant Examiner.*

UNITED STATES PATENT OFFICE
CERTIFICATE OF CORRECTION

Patent No. 3,404,906                                            October 8, 1968

Walter C. Hutton

It is certified that error appears in the above identified patent and that said Letters Patent are hereby corrected as shown below:

Column 4, line 28, "said ring part" should read -- said first part --.

Signed and sealed this 3rd day of March 1970.

(SEAL)
Attest:

Edward M. Fletcher, Jr.                              WILLIAM E. SCHUYLER, JR.
Attesting Officer                                               Commissioner of Patents